June 8, 1926.

J. F. KERLIN ET AL 1,587,779

METHOD OF AND MEANS FOR ATTACHING ELECTRICAL CONDUCTORS TO BRUSHES

Filed July 8, 1921

INVENTORS
John F. Kerlin
W. C. Kalb
BY
ATTORNEY

Patented June 8, 1926.

1,587,779

UNITED STATES PATENT OFFICE.

JOHN F. KERLIN AND WARREN C. KALB, OF BRADFORD, PENNSYLVANIA, ASSIGNORS, BY MESNE ASSIGNMENTS, TO NATIONAL CARBON COMPANY, INC., OF NEW YORK, N. Y., A CORPORATION OF NEW YORK.

METHOD OF AND MEANS FOR ATTACHING ELECTRICAL CONDUCTORS TO BRUSHES.

Application filed July 8, 1921. Serial No. 483,191.

This invention relates to methods of and means for securing electrical conductors of the type commonly called pig-tails, to brushes of the character used for delivering electric currents to, or collecting the same from, the rotating elements of dynamo-electric machinery.

It is proposed in the present invention to fasten the pigtail to the brush by forming an opening in the brush, inserting the pigtail therein, and securing it in place by means of a retaining member in the form of a solid piece of conductive material.

The invention proposes particularly the use of a retaining member consisting of particles of conducting material consolidated prior to its introduction into the brush and having the property of readily adapting itself under relatively small compressive forces to the unfilled portion of the opening in the brush, so as to secure the conductor firmly in place and establish an electrical path of low resistance between the body of the brush and the pigtail.

In the preferred form of embodiment of the invention, the insert consists of a composition of powdered metal and graphite, consolidated under high pressure and baked at high temperature in a reducing atmosphere. In the specific form of embodiment hereinafter referred to, the metal powder is preferably composed of a large percentage of copper and a small percentage of lead or other soft metal binding agent which apparently has the property of forming a partial or surface alloy with the copper so as to produce a material having high mechanical strength and low electrical resistance. The graphite, employed in the preferable form of the composition, serves for the purpose of increasing the softness of the material, i. e., its susceptibility of "flowing" or adapting itself under compression to the space in which the material is confined.

The composition thus constituted is comparable to metallic copper, in that it is solid in character and is possessed of high conductivity and good mechanical strength, but it differs radically therefrom in that it requires only relatively small compressive force to become conformed to the unfilled portion of the opening in the brush. This property of the material is extremely important in the present invention for the reason that the brush is somewhat fragile in character and entirely incapable of withstanding the force which would be required for conforming solid copper or similar metal.

The above features and various other objects and features of the invention will now be described with reference to the accompanying drawings, in which, Figure 1 illustrates a brush having the end of a pig-tail inserted in an opening thereof and showing the members for securing the pig-tail in the brush being introduced into the opening;

Similar characters of reference designate similar parts in each of the several views.

Figure 1:
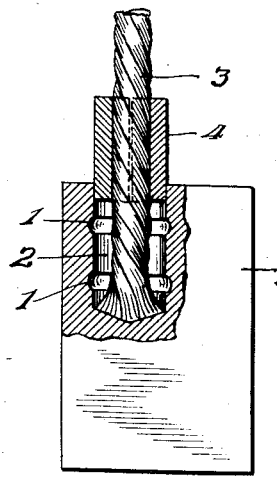

In accordance with the method of the present invention, the brush B is provided with an opening such as 2, the side walls of which are preferably formed with annular recesses such as 1. Into this opening is introduced one end of the pig-tail 3, the strands of the cable having previously been spread out substantially as shown, until the diameter thereof is substantially equal to that of the opening. A split sleeve such as 4 (Figure 2) is thereupon inserted between the pig-tail and the walls of the opening, this sleeve being of such diameter and thickness as to fit tightly between the conductor and the opening. This sleeve is driven down into the opening until it occupies the position substantially as shown in Figure 3.

The sleeve 4 is composed of a conductive material having a comparatively high melting point and so malleable as to "flow" when subjected to compressive force, particularly hammering by hand or by an automatic device such as the well-known oscillatory punch. Such a device applies the blows comparatively lightly and in rapid succession, thus saving time and minimizing any tendency of cracking or other breach of continuity of the material. The particular composition which at the present time is preferably employed, for the sleeve, consists of about 80 percent copper, 15 percent of lead and 5 percent graphite, these materials being combined into a solid composition by any suitable process, as for example, by mixing the materials in powder form, the copper being preferably approximately 200 mesh and the lead having a substantially equal or even greater fineness. This mixture is then compressed in dies of suitable form under a pressure of several tons per square inch—sufficient to cause the material to hold firmly together. These pieces are then baked in a reducing atmosphere until a temperature of approximately 1500° F. has been attained. The material thus produced is solid in form, has good mechanical strength, low electrical resistance and possesses the desired softness or malleability. It is to be understood, however, that the invention is not limited to material produced by the above-described or similar process, but that any material meeting the requirements as to malleability, solidity, melting point, electrical resistance, mechanical strength, etc., may be employed.

After the split sleeve has been partly or wholly introduced into the opening 2, it is hammered or otherwise acted upon by compressive force in a lengthwise direction, this being brought about preferably by the use of a hollow punch (not shown in the drawings), having an inside diameter slightly larger than that of the cable, and an outside diameter of approximately the same diameter as the hole. This hammering operation serves, first, to drive the sleeve firmly against the bottom of the hole so as to cause the strands of the cable to enter partially into the brush material and thus establish extraordinarily good electrical connection between the pig-tail and the brush at the bottom of the hole. The hammering serves, further, to shorten the sleeve so that the material thereof flows in a radial or lateral direction, against the exterior surface of the pig-tail and against the inner wall of the opening, thus reducing somewhat the diameter of the pig-tail and establishing intimate electrical and mechanical connection between the same and the walls of the opening. When these walls are recessed, as illustrated in the present embodiment, the material of the sleeve will flow into the recesses and serve thus to enhance the security with which the sleeve and pig-tail are locked in the brush. A connection of extremely low resistance and high mechanical strength and durability is thus formed.

The present invention, in that it employs a retaining member which is in the form of a solid piece at the time of its introduction into the brush, affords great advantage, both in simplicity of manipulation and in the quality of result produced, over the heretofore proposed forms of pigtail connections in which the retaining material is introduced in powdered, laminated, or other non-solid form. By virtue of its initial solidity, the retaining member of the present invention has the quality of continuity between its particles and possesses the mechanical strength and low electrical resistance, so much desired in pig-tail connections.

This retaining member, moreover, because of its initial solidity, will not disintegrate or work loose by the vibration to which the brush is subjected in actual practice. The connection is, therefore, permanent and lasts for the entire life of the brush.

Figure 2:
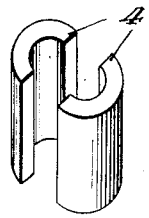
Figure 2 is a perspective view of the members for securing the pig-tail of Figure 1 in the brush.
Figure 5:
Figures 5 and 9 are views illustrating modifications of Figure 2.
Figure 3:
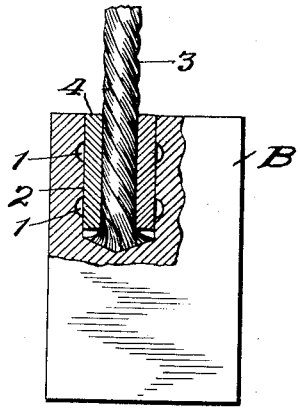
Figure 3 is a view similar to Figure 1, showing the members of Figure 2 inserted in the opening.

In Figure 5 is illustrated a sleeve formed of a single piece, which may be employed in this invention in substantially the same manner as the split sleeve of Figure 2. The single sleeve has the slight disadvantage, however, that the pig-tail will have to be threaded through the sleeve in order to insert the latter into the opening in the brush.

Figures 6, 9, 10:
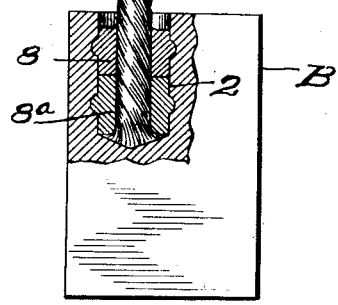

In Figure 6 is illustrated a modification which consists in the use of a pair of half-length sleeves 8 and 8$^a$, the latter of which is inserted first, and hammered in place so as to secure the lower end of the pig-tail in the opening 2. After this operation is completed, the sleeve 8 is placed on top of sleeve 8$^a$ and thereupon subjected to the hammering operation in order to secure the upper end of the pig-tail in the opening. This form of connection is of advantage for use with large brushes, in which the length of the sleeve may be such as to render the longitudinal hammering ineffective for causing the desired lateral flow of the lower portion of the sleeve material.

Figure 4:
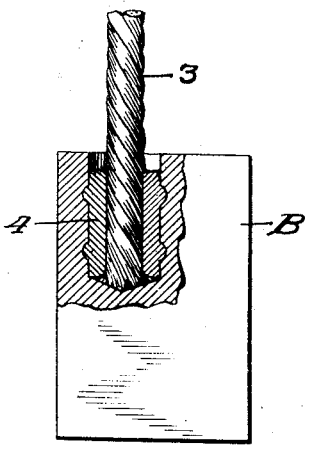
Figure 4 is a view similar to Figure 3, showing the members of Figure 2 after having been operated on in accordance with the present invention for securing the pigtail in the brush.
Figure 7:
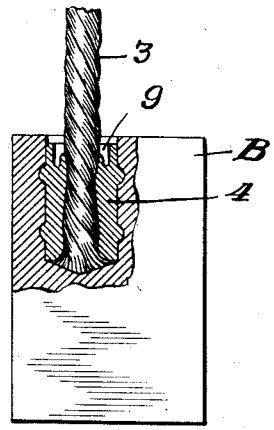
Figures 6, 7, 8 and 10 are views illustrating modifications of Figure 4.

In Figure 7 is indicated a modification of Figure 4, this form of connection being produced in the same manner as that of Figure 4, with the addition, however, of a second hammering operation. After the sleeve is expanded in the opening of the brush, in the manner described in connection with Figure 4, the punch employed for bringing about this compression is withdrawn and replaced by a similar one of smaller outside diameter. The result of the use of this punch is illustrated in Figure 7, in which 9 designates the opening formed by the second punch in the sleeve 4.

It will be observed that the portion of the sleeve material close to the pig-tail is forced downwardly and against the cable so as to still further compress the same and form a neck thereon. This additional operation, therefore, has the effect of securing the cable still more firmly in the brush and reducing still further the electrical contact resistance.

Figure 8:
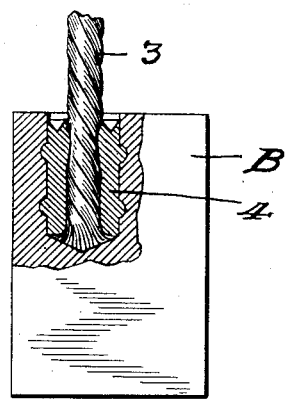

Figure 8 illustrates a modification by which the result of the two hammering operations of Figures 4 and 7, respectively, may be achieved by a single operation. In this modification use is made of a circular punch having a wedge-shaped surface, the result of which is not only to cause the lateral flow of the sleeve material, as in Figure 4, but to force the same into particularly intimate contact with the portion of the cable at the upper end of the sleeve, so as to form a neck thereon similarly as in Figure 7.

Figures 9 and 10 show a modification in which the malleable insert 15 surrounds the pigtail only partially, the cross-section of the insert being shaped somewhat like a crescent, except that the tips of the crescent are blunt and rounded off rather than sharp. When this insert is driven down into the opening in the brush, alongside the pigtail as in Figure 10, the ends of the conductors are forced into intimate engagement with the bottom of the opening and the one side of the pigtail is driven into direct contact with the side wall of the opening. A large area of direct contact between brush and pigtail is thus secured and the electrical resistance of the contact is, therefore, particularly low. The hammering of the insert causes the material thereof to expand laterally, as hereinbefore described, and to enter the side of the pigtail as shown at 12, so as to retain the same securely in the brush.

It will be noted that in all of the above-described methods of practicing the invention, use is made of conductive material in the form of an initially solid member, softer than metallic copper, which member is caused to flow laterally and enter the crevices in both pigtail and brush, so as to provide intimacy of contact between the cable and the insert and between the insert and the brush material. This serves to minimize the electrical resistance and to retain the pigtail securely in the opening of the brush. It will be understood of course that the features shown in any one of the disclosed forms of the invention may be employed in conjunction with the features of any other form.

Although only a few forms of the invention are shown and described herein, it will be understood that many changes and modifications may be made therein, it being our intention to claim the invention broadly in whatever form its principle may be embodied.

What is claimed is:

1. The method of securing a conductor in an opening in a brush, which consists in inserting the conductor into the opening, inserting further a member composed of finely divided conducting material consolidated prior to its insertion into the opening, said member being capable of adapting itself under the action of compressive force to the unfilled portion of the hole in the brush, and subjecting the said member to compressive force so as to cause it to fill the said space and retain the conductor in the brush.

2. The method herein described, which consists in inserting the conductor in an opening in the brush, inserting further a solid piece of malleable material, and subjecting the same to longitudinal force to cause the material thereof to flow so as to increase its lateral dimension.

3. The method of securing a conductor in a brush, which consists in inserting the conductor in an opening in a brush, inserting further a member of initially solid conductive material substantially softer than solid copper, and securing the said member in the opening.

4. The method herein described, which consists in spreading the end of the conductor until the diameter thereof is substantially equal to that of the opening, inserting the same in the opening, and inserting in the space between said conductor and the wall of the opening a member of malleable, solid material and applying longitudinal compressive force to said member to expand the same laterally and cause the flow of the material of said member into intimate engagement with the conductor and the wall of the opening.

5. The method of securing a conductor in an opening in a brush, which consists in surrounding the part of the conductor which cooperates with the said opening with malleable conductive material, applying compressive force to said material to bring about close conformity between the said material and the walls of the conductor and the opening, and applying additional compressive force to the part of the material adjacent to the conductor, so as to form constriction in the diameter of the conductor adjacent the upper edge of the said material.

6. In combination, a brush having an opening, a conductor for said brush, an initially integral member for retaining said conductor in said opening, said member being softer than solid metallic copper.

7. In combination, a brush having an opening, a conductor for said brush, and a member of soft metal-graphite composition forced into the space between the conductor and the wall of said opening.

8. The method of securing a conductor in a brush, which consists in associating a member of solid malleable material with the conductor in an opening in the brush, and compressing said member lengthwise so as to cause the material of said member to flow into intimate engagement with the conductor and secure the same in the opening.

9. In combination, a brush having an opening, a conductor for said brush, and an insert of solid conductive material having a substantially crescent-shaped cross-section expanded into the space between one side of the conductor and the opening.

10. In combination, a brush having an opening, a conductor extending into the opening, and solid, malleable, conductive material softer than solid copper compressed against the conductor and engaging the wall of the opening for retaining the conductor in the brush.

11. The method of securing a pig-tail in a brush which consists in forming an opening partly through the brush, inserting the end of the pigtail into the opening in firm electrical connection with the bottom of the opening, and securing the conductor in place by wedging between the conductor and the wall of the opening, a solid insert softer than solid copper.

12. In combination, a brush having an opening, a conductor for said brush and an insert for retaining the conductor in the brush, said insert being composed of a mixture of finely divided copper, lead and graphite.

13. In combination, a brush having an opening, a conductor for said brush, and an insert for retaining the conductor in the brush, said insert being composed of finely divided copper, graphite and soft binding metal consolidated prior to its introduction in the brush.

14. In combination, a brush having an opening, a conductor for said brush, and an insert for retaining the conductor in the brush, said insert being composed of particles of material having high electrical conductivity held in substantially molecular contact by particles of soft material.

15. In combination, a brush having an opening, a conductor for said brush, and an insert for retaining the conductor in the brush, said insert being composed of finely divided particles held in substantially molecular contact.

16. In combination, a brush having an opening, a conductor for said brush, and an insert for securing said conductor in said opening, said insert being softer than solid metallic copper and being composed of a consolidated composition of finely divided conducting material.

17. In combination, a brush having an opening, a conductor for said brush, and an insert for securing said conductor in said opening, said insert being composed of a consolidated composition of powdered metal and graphite.

18. In combination, a brush having an opening, a conductor extending into the opening and conductive material in the form of a plurality of separate members placed one above the other in the space between the conductor and the wall of the opening and compressed into the said space for retaining the conductor in the brush.

19. In combination, a brush having an opening, a conductor extending into the opening and conductive material in the form of a plurality of separate members placed one above the other in the space between the conductor and the wall of the opening and compressed into the said space for retaining the conductor in the brush, said opening being provided with a recess adjacent its upper end and the said conductive material extending into said recess to secure said members in place.

20. In combination, a conductor having a cavity therein, a second conductor having an end received in said cavity and a plug formed of baked and compressed metal and graphite in said cavity uniting the two conductors.

21. The method of uniting two electrical conductors, one of which has a cavity therein, which comprises inserting a uniting member of malleable material in said cavity, and applying pressure to said member to cause a portion of it to flow into a recess that communicates with the cavity.

In testimony whereof we have affixed our signatures to this specification.

JOHN F. KERLIN.
WARREN C. KALB.